United States Patent [19]
Wagner et al.

[11] Patent Number: 5,358,567
[45] Date of Patent: Oct. 25, 1994

[54] ROLL STAND, AS FOR A COIL DE-OILER

[75] Inventors: Gary A. Wagner, Schererville, Ind.; James S. Ruscyk, Palos Heights, Ill.

[73] Assignee: Hadady Corporation, Lansing, Ill.

[21] Appl. No.: 961,422

[22] Filed: Oct. 15, 1992

[51] Int. Cl.⁵ .......................................... B05C 11/02
[52] U.S. Cl. ................................. 118/114; 118/117
[58] Field of Search .......................... 118/114–117, 118/419; 492/40, 41; 100/168, 170; 427/359, 360; 226/183, 190, 193, 194; 72/43, 238, 245, 248

[56] References Cited
U.S. PATENT DOCUMENTS

| 2,818,904 | 1/1958 | Ambrose | 100/170 |
| 3,014,811 | 12/1961 | Storck | 118/117 |
| 3,710,469 | 1/1973 | Kitazawa | 492/40 |
| 3,938,362 | 2/1976 | Falk et al. | 72/238 |
| 4,669,163 | 6/1987 | Lux et al. | 492/41 |

Primary Examiner—Matthew O. Savage
Attorney, Agent, or Firm—Wallenstein, Wagner & Hattis, Ltd.

[57] ABSTRACT

A roll stand, such as for supporting a pair of adjacent rolls for maintaining a lubricant film thickness on a sheet of steel, tin, or the like, traveling therethrough, is disclosed. The roll stand comprises a first and second, spaced, support members for supporting the rolls extending therebetween. The support members each include a pair of spaced guide rods. Each of the support members further includes first and second spaced carriers slidably carried by their respective guide rods. Pillow block bearings are disposed on each of the carriers for receiving respective ends of the rolls. A pair of hydraulic piston and cylinder devices move each of the first carriers relative to their respective second carriers, to control the pressure between the rolls. A pair of jacks, manual or motorized, move each of the second carriers to adjust the rolls to the proper height.

4 Claims, 2 Drawing Sheets

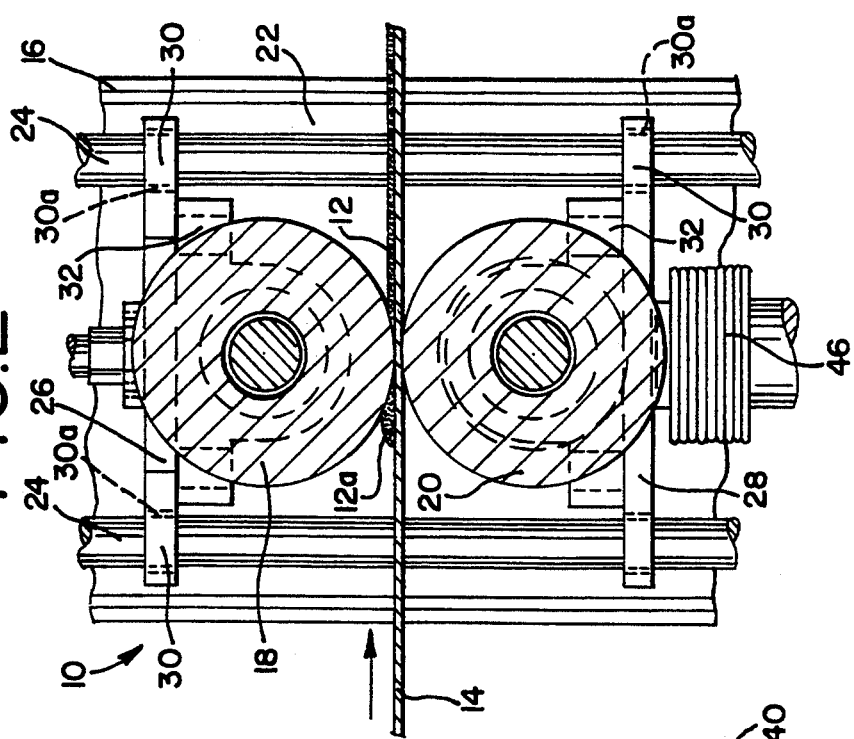
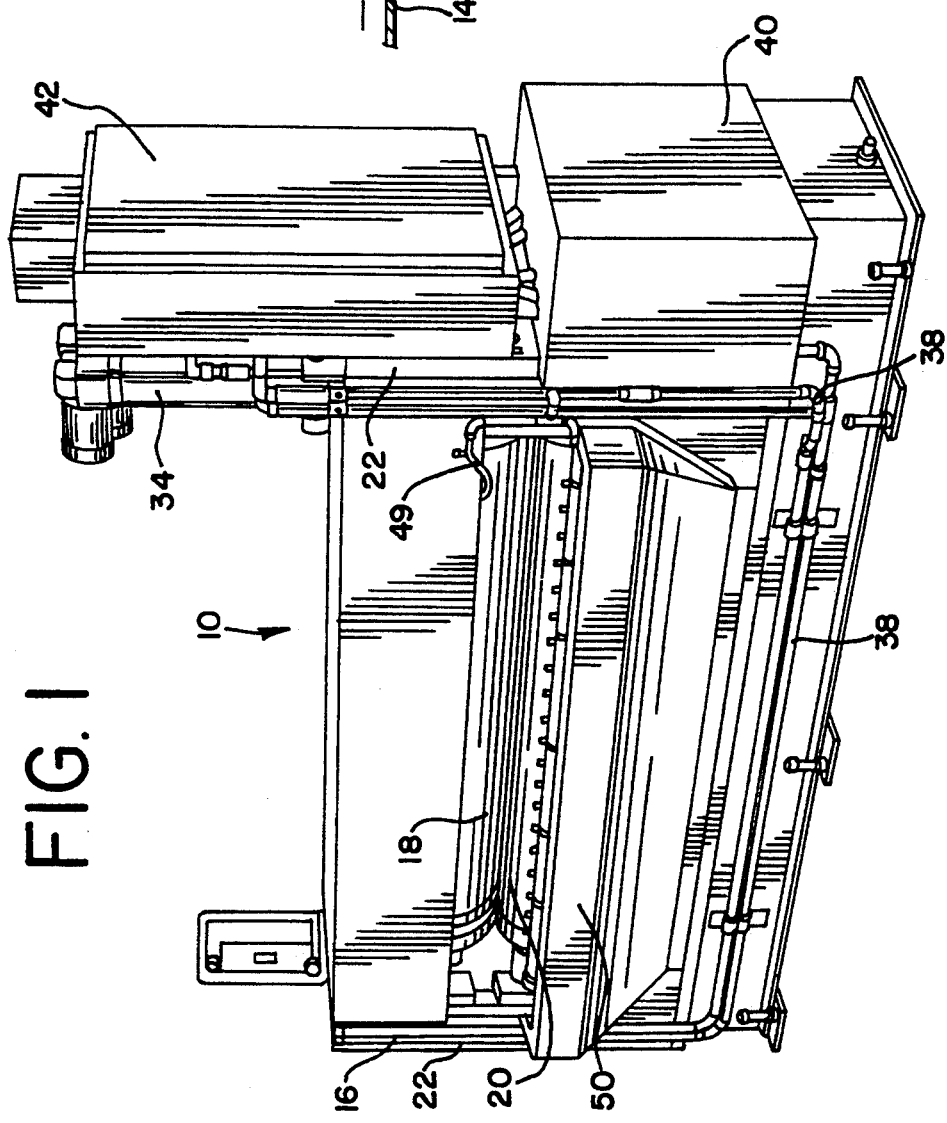

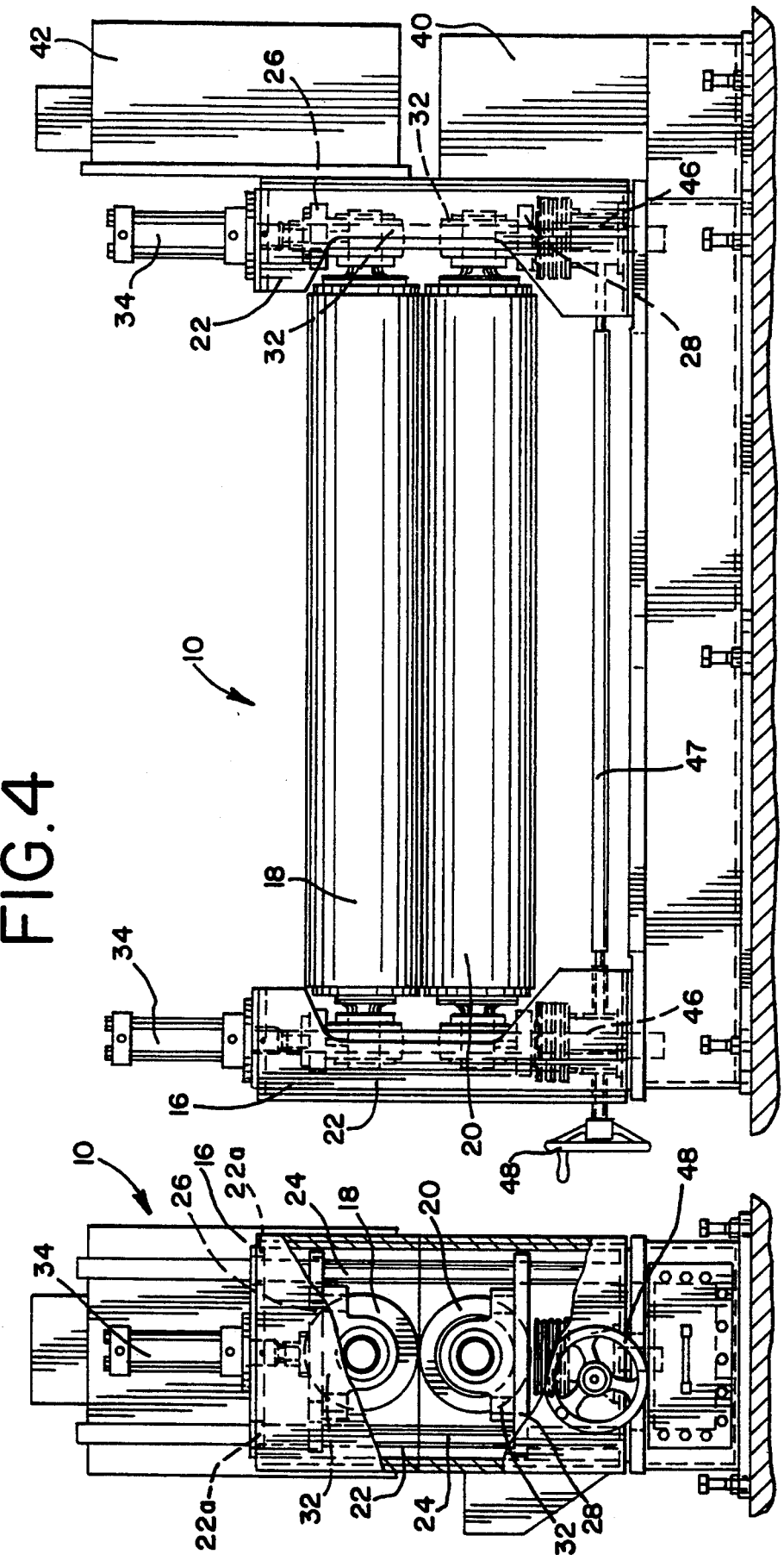

ROLL STAND, AS FOR A COIL DE-OILER

TECHNICAL FIELD

Applicant's invention relates to a roll-stand for accurately maintaining two rolls in contacting alignment, and more particularly, to the roll stand and the accompanying pair of rolls used for modifying the amount of coating, such as lubricant, on sheets of material, such as metal, passing therethrough.

BACKGROUND PRIOR ART

Roll stands, as for supporting a pair of adjacent rolls, such as mill rolls, are well known. The term "mill roll" typically refers to a steel roll, as commonly used in various industrial applications. As used herein, the term "roll" is intended to include such steel mill rolls, as well as nylon rolls, urethane rolls, rubber rolls, and nonwoven rolls, discussed below.

One use of such a roll stand is as a de-oiler to regulate the amount of lubrication, such as oil, on steel. The steel is typically wound in a coil, and the steel is unwound as a strip and passed between the mill rolls. Depending upon the amount and consistency of the oil on the steel, as well as the amount desired, the de-oiler can add oil to the strip, remove oil from the strip, or both.

In order to maintain a thin layer of the oil on the strip, a tremendous pressure must be maintained between the rolls. In order that the layer of oil is uniform, the pressure between the rolls must be consistent across the length of the rolls.

Further, in order that the strip properly tracks as it passes between the rolls, the rolls must be maintained properly in parallel alignment.

The present invention is provided to solve these and other problems.

SUMMARY OF THE INVENTION

It is an object of the invention to provide a roll stand, such as for supporting a pair of adjacent rolls for modifying an oil film thickness on a sheet of steel, tin, or the like, traveling therethrough.

In accordance with the invention, the roll stand comprises first and second, spaced, support members for supporting the rolls extending therebetween. The support members each include a pair of spaced guide rods. Each of the support members further includes first and second spaced carriers slidably carried by their respective guide rods. Bearings, such as pillow block bearings, are disposed on each of the carriers for receiving respective ends of the rolls. Means are provided for moving each of the first carriers relative to their respective second carriers, to control the pressure between the rolls. It is contemplated that the first carrier moving means comprises a pair of hydraulic piston and cylinder devices. Means are also provided for moving each of the second carriers to adjust the rolls to the proper height. It is further contemplated that the second carrier moving means comprises a pair of jacks, manual or motorized.

Other features and advantages of the invention will be apparent from the following specification taken in conjunction with the following drawings.

BRIEF DESCRIPTION OF DRAWINGS

FIG. 1 is a perspective view of a roll stand in accordance with the present invention;

FIG. 2 is a partial sectional view of a support member in accordance with the invention;

FIG. 3 is an end view of the roll stand of FIG. 1; and

FIG. 4 is a sectional view of the roll stand taken along line 4—4 of FIG. 3.

DETAILED DESCRIPTION

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

A de-oiler, generally designated 10, for regulating the amount of lubricant 12 on a strip of material 14, such as steel, tin, or the like, is illustrated in the figures. As used herein, the term "de-oiler" means a device which adds lubricant to the strip, removes lubricant from the strip, or both. The important consideration is that the strip has a uniform layer of lubrication after it exits the de-oiler.

The lubricant 12 is typically a petroleum based, a water based, or a dry lubricant, as is well known. The strip 14 can be initially lubricated, unlubricated, or unevenly lubricated. As discussed below, the de-oiler 10 can be adjusted to remove a quantity of the lubricant 12 already on the strip 14, to thereby provide a uniform, but thinner, layer of the lubricant 12 on the strip 14. Additionally, the de-oiler 10 can be adjusted to add a quantity of the lubricant 12 to the strip 14, to thereby provide a uniform, but thicker, layer of the lubricant 12. Further, the de-oiler 10 can be adjusted to spread the lubricant 12 to thereby provide a consistent thickness of the lubricant 12 along the strip.

The de-oiler 10 comprises a roll stand 16 adapted for supporting upper and lower rolls 18,20, respectively. The rolls 18,20, are designated herein as 'upper' and 'lower', though it should be understood that other relative positions of the rolls 18,20 are comprehended as within the spirit and scope of the invention.

The rolls 18,20 are preferably made from a plurality of individual, non-woven, resin-bonded, fiber discs, such as 3M Mill Rolls of 3M Type III material, sold by the 3M Abrasive Systems Division, 3M Corporation, St. Paul, Minn. The Type III material is very densely packed, with a ratio of 97% material and 3% void. The discs measure 11" O.D., and 8" I.D., with a 72" face length. The discs are placed on a shaft machined from SAE 1045 hot rolled solid bar to a diameter of 8". Four $\frac{1}{2}"\times\frac{1}{2}"$ positive keys are spaced at 90 degrees along the roll face. The rolls 18,20, are available from Dial-In, Inc., Lansing, Ill.

The roll stand 16 includes a pair of opposed, spaced, support members 22 for supporting the upper and lower rolls 18,20, extending therebetween.

As shown in greater detail in FIG. 2, the support members 22 each include a pair of 2" guide rods 24, spaced on 19.5" centers. The support members 22 include upper and lower support weldments 22a, into which the guide rods 24 are pressed for rigidity. Each of the support members 22 further includes upper and lower, spaced carriers 26,28, respectively, which are slidably carried by their respective guide rods 24. Specifically, each of the carriers 26,28 has a pair of spaced holes 30. The holes 30 are each 2.500" in diameter, into which a bronze bushing 30a is press fit. The bronze bushings 30a have internal diameters of 2.000", with a tolerance of +0.003" and −0.000". In the preferred embodiment, the holes 30 of each of the carriers 26,28, are spaced on 16.125" centers, ±0.001". This tolerance is critical to insure proper alignment of the guide rods 24 and the carriers 26,28, to maintain proper alignment of the rolls 18,20.

Each of the support members 22 includes two pillow block bearings 32, each bolted to a respective one of each of the carriers 26,28. The bearings 32 conventionally receive respective ends of the rolls 18,20.

Each of the support members 22 further includes a hydraulic piston and cylinder device 34 to move each of the upper carriers 26, via an adapter 33, relative to their respective lower carriers 28, along the guide rods 24 to control the contact pressure between the upper and lower rolls 18,20. The hydraulic piston and cylinder devices 34 provide a force of up to 350 lbs. per linear inch of roll face. The hydraulic pressure is provided to each of the piston and cylinder devices 34 by common hydraulic lines 38 to maintain equal pressure, and hence equal force, applied by each of the piston and cylinder devices 34. The hydraulic pressure is provided and regulated by conventional hydraulic controls (not shown) housed in a hydraulic control cabinet 40. An electrical control cabinet 42 is located above the hydraulic control cabinet 40, and houses conventional electrical controls (not shown).

Each of the support members 22 further includes a conventional mechanical jack 46, tied together for concurrent rotation by a connecting bar 47, for adjusting the height of the respective lower carrier 28. The jack 46 can be a machine screw actuator, such as sold by Duff-Norton, of Charlotte, NC. The jack 46 can be manually actuated, as by a handwheel 48, or motorized. The jacks 46 cooperatively move each of the lower carriers 28 to adjust the lower roll 20 to the proper height, such as to compensate for regrinding of the rolls 18,20, which changes their diameter.

In operation, as shown in FIG. 2, the strip 14, which typically is being concurrently unwound from a coil of steel (not shown), traverses between the upper and lower rolls 18,20. The pressure between the rolls 18,20, as determined by the piston and cylinder device 34, determines the thickness of the lubricant 12 as the strip exits from between the upper and lower rolls 18,20. Film thickness can be controlled between 10 to 700 mg., per square foot. Extra lubricant 12 forms as a pool 12a behind the rolls 18,20. As illustrated in FIG. 1, if additional lubricant is required, it is provided by a nozzle 49, which collects the lubricant 12 from a sump 50 via a dc controlled lubrication delivery system.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. For instance, it is contemplated that the present roll stand could be used for such purposes as wringing water from textiles.

We claim:

1. A coil mill roll stand comprising: first and second cylindrical shaped roll means adapted to provide a uniform thickness layer of lubricant across a surface of a strip of sheet steel material passing therebetween;

first and second support members spaced apart, each of said support members adapted for rotatably securing an end of each of said first and second rolls extending therebetween to maintain said rolls in parallel confronting relationship; each of said first and second support members including first and second parallel guide rods having first and second carriers extending therebetween, said carriers each having first and second holes therein receiving each of said respective first and second guide rods therethrough in slideable engagement therewith, said first and second holes each including a bushing therein in slideable engagement therewith, the first and second carriers on said first support member being spaced apart from and independently movable relative to the first and second carriers on said second support member, a first and second bearings mounted on each of said respective first and second carriers, said first and second bearings each rotatably securing a respective end of each of said first and second rolls, means for removably attaching said first and second bearings to said respective first and second carriers whereby said bearings and associated rolls may be attached or detached without removal of said carrier from said first and second guide rods and first and second means associated with each of said first and second carriers respectively for moving each of said respective first and second carriers along each of their respective first and second guide rods exactly relative to each other to move each of said respective first and second rolls exactly relative to each other.

2. A coil mill roll stand according to claim 1 wherein said first and second rolls are formed from a plurality of nonwoven synthetic fiber discs.

3. A coil mill roll stand according to claim 1 wherein said first means for moving each of said first carriers is a fluid pressure activated piston and cylinder device.

4. A coil mill roll stand according to claim 1 wherein said first means for moving each of said second carriers is a mechanical means.

* * * * *